(12) United States Patent
Castracane et al.

(10) Patent No.: US 6,341,526 B1
(45) Date of Patent: Jan. 29, 2002

(54) MICROMACHINED DIFFRACTIVE PRESSURE SENSOR SYSTEM

(75) Inventors: James Castracane; Mikhail A. Gutin, both of Albany, NY (US)

(73) Assignee: InterScience, Inc., Troy, NY (US)

(*) Notice: Subject to any disclaimer, the term of this patent is extended or adjusted under 35 U.S.C. 154(b) by 0 days.

(21) Appl. No.: 09/363,984

(22) Filed: Jul. 28, 1999

Related U.S. Application Data
(60) Provisional application No. 60/094,533, filed on Jul. 29, 1998.

(51) Int. Cl.[7] .............................. G01L 9/00; G01J 1/56; G01J 5/46
(52) U.S. Cl. ..................................... 73/705; 250/231.19
(58) Field of Search .......................... 73/705, 715–727, 73/706, 708; 250/231.19, 227.13, 227.14, 227.16, 227.19, 227.21, 231.16; 356/345, 358, 347

(56) References Cited

U.S. PATENT DOCUMENTS

| | | |
|---|---|---|
| 4,620,093 A | 10/1986 | Barkhoudarian et al. |
| 4,932,262 A | 6/1990 | Wlodarczyk |
| 5,087,124 A | 2/1992 | Smith et al. |
| 5,196,694 A * | 3/1993 | Berthold et al. ........ 250/231.19 |
| 5,258,614 A * | 11/1993 | Kidwell et al. ......... 250/227.16 |
| 5,365,789 A | 11/1994 | Totterdell et al. |
| 5,808,210 A | 9/1998 | Herb et al. |
| 5,892,860 A | 4/1999 | Maron et al. |
| 5,917,180 A | 6/1999 | Reimer et al. |

* cited by examiner

Primary Examiner—William Oen
(74) Attorney, Agent, or Firm—Jay R. Yablon; Michelle D. Simkulet (57) ABSTRACT

An improved optical pressure sensor determines the pressure of the fluid to be monitored by the deflection of a diaphragm in the pressure chamber of the sensor which has an inlet from the measured vessel. The deflection of the diaphragm is determined by monitoring the interference of diode light reflected from the diaphragm and a silicon grating structure superimposed over the diaphragm, at critical positions. Intensity detectors are placed at critical positions such as the specific orders of the diffraction grating to measure the interference intensity of the reflected light. The interferometric accuracy with which the pressure measurement is made with the present invention far exceeds that obtained with optical pressure sensors described in the prior art.

38 Claims, 6 Drawing Sheets

MICROMACHINED DIFFRACTIVE PRESSURE SENSOR SYSTEM

CROSS-REFERENCE TO RELATED APPLICATIONS

This application claims the benefit of U.S. Provisional Application No. 60/094,533, filed Jul. 29, 1998.

FIELD OF THE INVENTION

This invention relates to the field of micromachined pressure sensors, and particularly to micromachined pressure sensors that incorporate diffractive optics as a means of sensing the pressure.

BACKGROUND OF THE INVENTION

Several varieties of optical pressure sensors are comprised of micromachined sensors or components that serve as prior art to this invention. For example, U.S. Pat No. 4,620,093 describes an optical pressure sensor designed for rocket engine applications. This prior art optical pressure sensor incorporates a micromachined diaphragm etched with a diffraction grating to measure the changes in central order and first order diffracted beams of impinging laser light to monitor the effects of pressure and temperature. Additionally, U.S. Pat. No. 4,932,262 describes a pressure sensor comprising two micromachined elements, one of which is a diaphragm, which sandwich an optical fiber coupled to an optical grating. The variations monitored in the output of the fiber reflect the pressure variations induced on the diaphragm.

U.S. Pat. No. 5,101,664 describes a prior art optical pressure transducer than is comprised of a micromachined flexible silicon diaphragm fixed to a silicon bridge. The bridge is driven at its resonant frequency which is dependent upon the pressure applied to the silicon diaphragm. Measurements of the bridge's vibrations are made using interferometric techniques. U.S. Pat. No. 5,105,665 also describes prior art based on the vibrating bridge fixed to a diaphragm style of optical sensor. This prior art also uses optical means to interpret the pressure on the diaphragm from the vibration of the bridge. U.S. Pat. No. 5,152,173 also provides prior art of an optically excited and detected micromachined pressure sensor comprised of a vibrating beam mounted on a diaphragm.

The prior art listed above are all optically based pressure sensors which rely on simple intensity reflectance measurements to determine the pressure opposite the deflecting diaphragm. This limits the sensitivity of pressure measurements which can be obtained, in contrast to significantly more sensitive optical pressure measurements that can be obtained by detecting and analyzing optical interference patterns.

U.S. Pat. No. 5,808,210 describes a prior art resonant microbeam pressure sensor that provides frequency based measurements corresponding to strain on the diaphragm supported microbeam. Although the microbeam is integrated into the diaphragm to which external pressure to be measured is applied, the sensing mechanism relies on detecting and accurately measuring the resonant frequency of the microbeam.

In addition to the optically and frequency based sensors described above, there are a variety of micropressure sensors based in semiconductor materials which rely on piezo electric or piezo resistive properties to measure pressure. The limiting factor in piezo based pressure sensors is their inability to be used in applications in which there are electromagnetic fields present or in applications which risk explosion due to their electrical nature. It is in these areas that an improvement to the prior art is clearly needed.

OBJECTS OF THE INVENTION

It is therefore desirable to provide an improved optical pressure sensor system which utilizes micromachined diffraction grating components capable of significantly more sensitive pressure measurements.

It is also desirable to provide an improved optical pressure sensor system which utilizes micromachined diffraction grating components capable of application in the presence of electromagnetic fields and explosion risks.

SUMMARY OF THE INVENTION

The present invention provides an improved optical pressure sensor over the prior art, by relying on a significantly more sensitive optical interference measurement to determine the desired pressure. The pressure of a fluid in a vessel for which pressure is to be monitored (measured vessel) is related in the present invention to the deflection of a diaphragm in a pressure chamber of the sensor which has an inlet for fluid transfer from the measured vessel. The deflection of the diaphragm is determined by monitoring the interference at critical positions of coherent light reflected from the diaphragm and from a grating structure superimposed over the diaphragm. Intensity detectors are placed at critical positions such as the specific orders of the diffraction grating to measure the interference of the reflected light. The interferometric accuracy with which the pressure measurement is made with the present invention far exceeds that obtained with optical pressure sensors described in the prior art. The interferometric detection is sensitive to motion equivalent to fractions of the wavelength of light used in the system.

The present invention has direct application to sensitive pressure measurements in a variety of industrial situations. The present invention is a viable option as a pressure monitoring system for pipelines and storage tanks, whether remote or local. The digital nature of the measurement results could easily allow for remote monitoring or local storage of results for periodic downloading. In addition, the present invention is an ideal pressure monitor for automated packaging and manufacturing systems such as in the pharmaceutical and chemical industries.

BRIEF DESCRIPTION OF THE DRAWINGS

The features of the invention believed to be novel are set forth in the associated claims. The invention, however, together with further objects and advantages thereof, may best be understood by reference to the following description taken in conjunction with the accompanying drawings in which:

DETAILED DESCRIPTION OF THE PREFERRED EMBODIMENT

Figure 2:
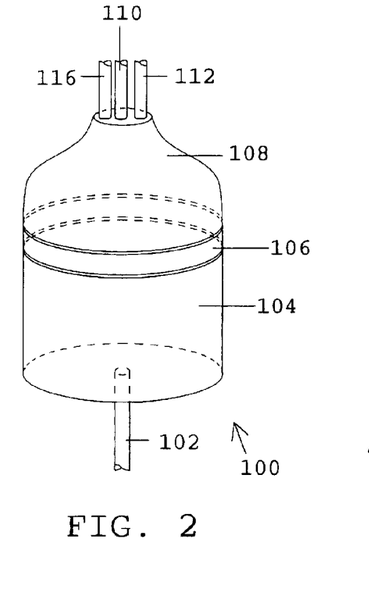
FIG. 2 is a perspective view of the micromachined diffractive pressure sensor.
Figure 3:
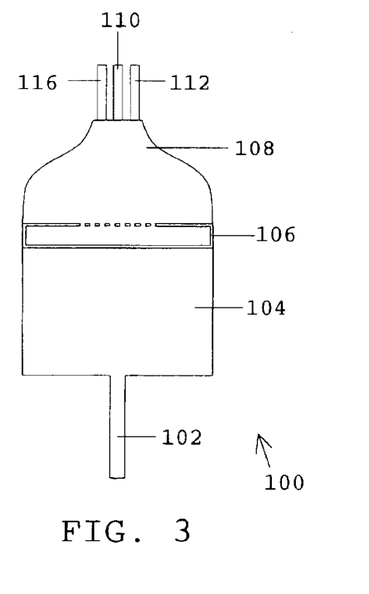
FIG. 3 is a cross-sectional view of the micromachined diffractive pressure sensor.
Figure 4:
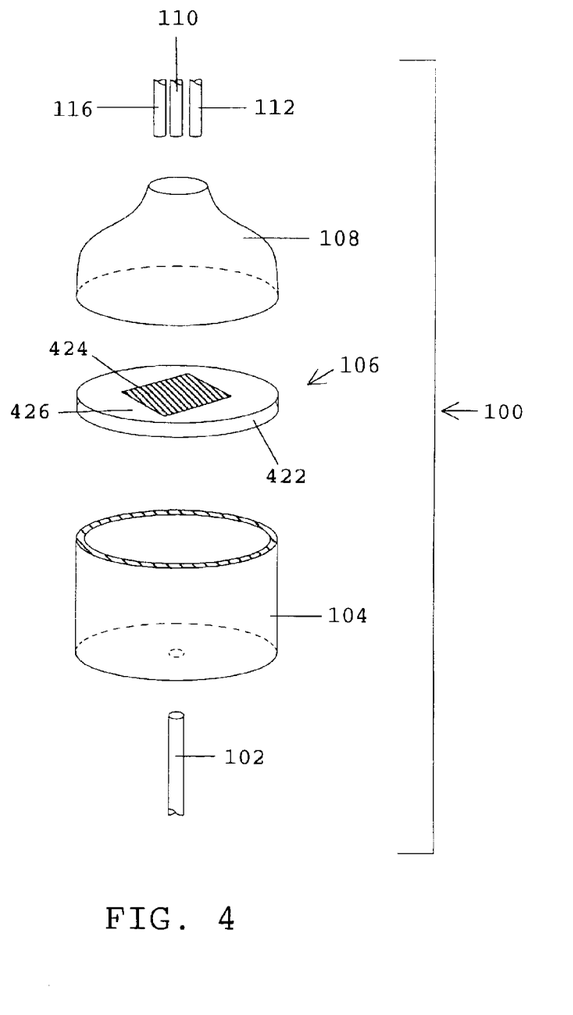
FIG. 4 is an exploded view of the micromachined diffractive pressure sensor.

A micromachined diffractive pressure sensor system in accordance with the invention, is described below with reference to FIG. 1. A diffractive pressure sensor 100, is comprised of a pressure inlet 102, a pressure chamber 104, a diaphragm grating device 106 described in detail below, a gradient index medium 108, a primary output fiber 110, a secondary output fiber 112, and an input fiber 116. The diffractive pressure sensor 100, is connected to a multiple channel photodetector 114, via primary and secondary output fibers 110 and 112, respectively. Additionally, a diode laser source 120, is connected to input fiber 116, via a fiber optic connector 118. Primary output fiber 110, secondary output fiber 112, and input fiber 116 will be collectively referred to as lightwave input and output means, since some embodiments of the invention permit the function of any or all of these to be carried out by a single multimode fiber or similar light carriage means, rather than by separate, discrete fibers. Similarly, while these are referred to as "fiber" in this disclosure, it is understood that any form of light carriage means suitable to the light carriage functions to be described are considered to be within the scope of this disclosure and its associated claims. FIGS. 2, 3, and 4 show the details of the diffractive pressure sensor 100 with a perspective view, cross-sectional view, and exploded view, respectively. Referring to FIGS. 2, 3, and 4, diffractive pressure sensor 100 is comprised of pressure inlet 102, which serves to connect the measured vessel/medium (not shown) for which pressure of its fluidic contents is to be measured, to diffractive pressure sensor 100. Pressure inlet 102 transfers the pressure of the measured fluid medium (i.e. air, gas, or liquid) to pressure chamber 104 of diffractive pressure sensor 100. Pressure chamber 104 toward the lower region of diffractive pressure sensor 100 is a sealed chamber, aside from pressure inlet 102, shown to be cylindrical with a circular or oval cross-section in the preferred embodiment, but which can alternatively be constructed in any other cross-sectional shape such as a square or rectangle. The pressure chamber is topped by diaphragm grating device 106.

Figure 5:
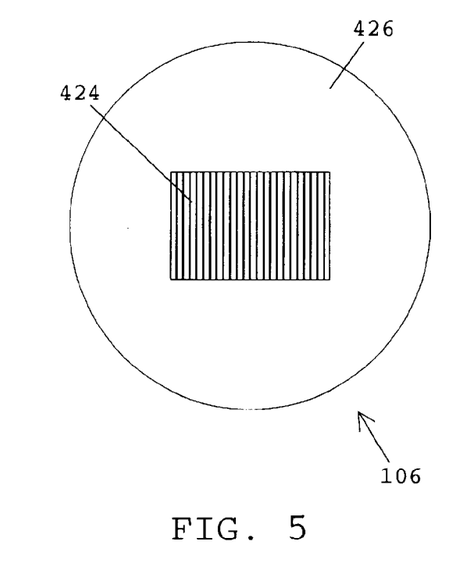
FIG. 5 is an orthogonal view of the diaphragm grating device.
Figure 6:
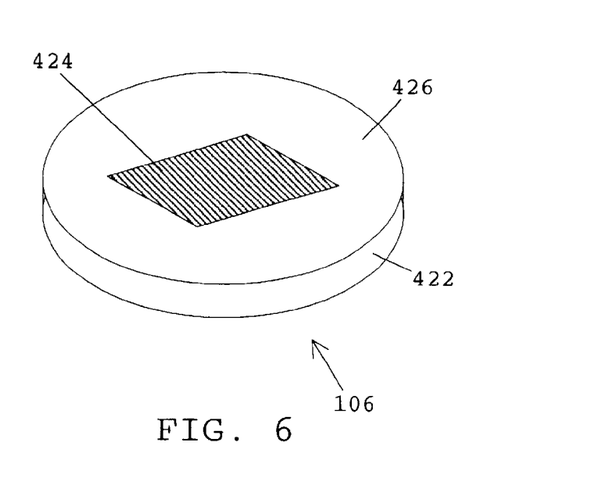
FIG. 6 is a perspective view of the diaphragm grating device.

Diaphragm grating device 106 is best described with reference to the exploded view of diffractive pressure sensor 100 in FIG. 4 as well as the plane and perspective views of diaphragm grating device 106 in FIGS. 5 and 6. Diaphragm grating device 106 is constructed of a material such as silicon. Its base is a micromachined diaphragm 422. A micromachined grating support frame 426 extends up from, over the top of, and substantially parallel to micromachined diaphragm 422. A micromachined diffraction grating 424 is substantially centered in support frame 426, and is also substantially parallel to the diaphragm 422.

Figure 1:
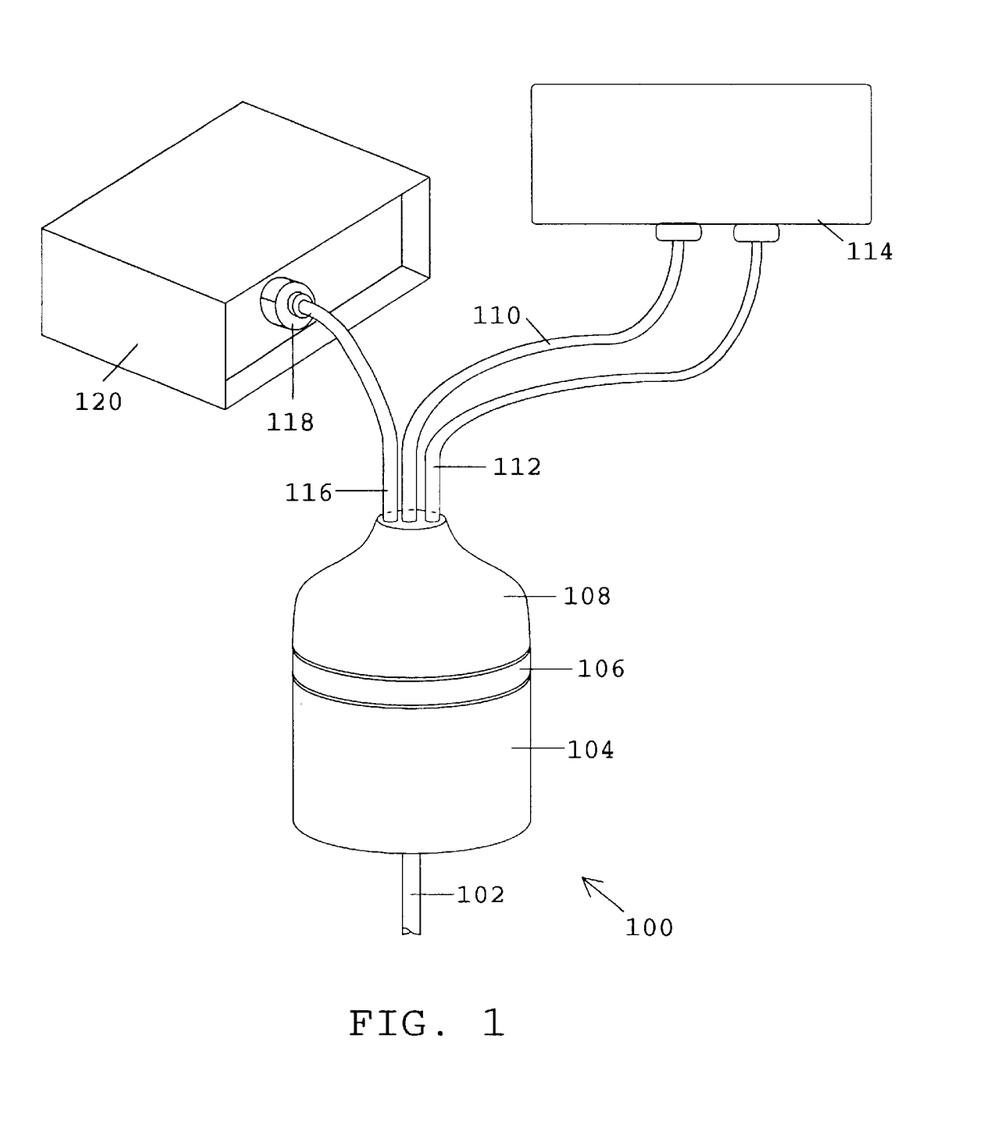
FIG. 1 is a perspective view of the diffractive pressure sensor system.
Figure 7:
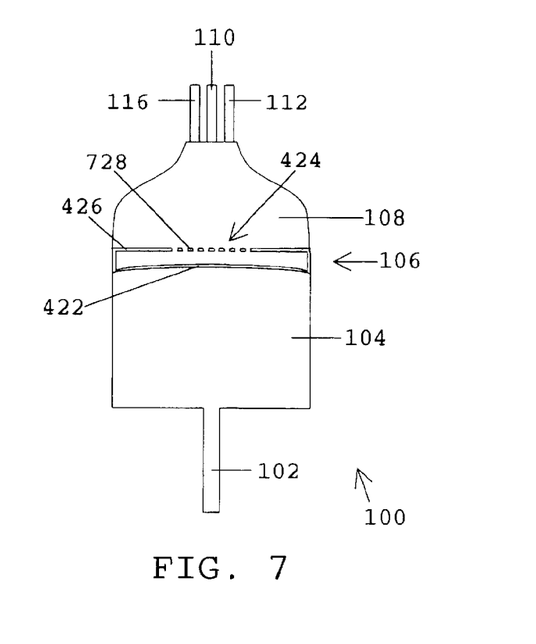
FIG. 7 is a cross-sectional view of the diffractive pressure sensor showing the deflection of the micromachined diaphragm.

The operating principles of the diffractive pressure sensor system are best described initially with reference to FIG. 1. As described above, the pressure of the fluid to be measured is introduced from the measured vessel (not shown) to pressure chamber 104 via pressure inlet 102. Since it is a sealed cavity, the pressure inside pressure chamber 104 will be identical to that in the measured vessel (not shown). The pressure of the fluid transferred into chamber 104 deflects micromachined diaphragm 422 of diaphragm grating device 106, as seen in FIG. 7. To measure the pressure, light from diode laser 120 is introduced through input fiber 116, and through gradient index medium 108, to impinge on diffraction grating 424, as well as diaphragm 422, of diaphragm grating device 106. Alternatively, any coherent light source may be used in place of the diode laser 120.

The preferred embodiment of the present invention includes an integral path from input fiber 116 to diaphragm grating device 106 and back to primary and secondary output fibers, 110 and 112 respectively, by way of gradient index medium 108. In the preferred embodiment, gradient index medium 108 is fabricated to provide the necessary imaging pathways among input fiber 116, output fibers 110 and 112, and the diaphragm grating device 106. Gradient index media 108 is an integrated optical component that utilizes ion induced changes in index of refraction to create optical channels or buried waveguides through a solid optical component. This technique allows for the construction of simple to sophisticated optical circuits in a single integrated optical component. Alternative embodiments or substitutes for gradient index medium 108 may include but is not limited to a separate discrete optics lens system. However, the gradient index medium 108 is preferred due to its low cost, reliability, and robust construction. Integral construction of gradient index medium 108 creates a more durable, and therefore, more reliable sensor system.

Referring to FIG. 7, the fundamental optical principle on which the sensor system operation is based is to utilize the interference of light reflected from the grating rulings 728 of micromachined diffraction grating 424, and from its underlying surface—namely the top surface of micromachined diaphragm 422—to yield a diffraction pattern that is used to obtain a diaphragm deflection measurement with interferometric accuracy. In particular, diaphragm 422 is deflected towards or away from diffraction grating 424 in response to positive or negative pressure variations in pressure chamber 104, introduced via pressure inlet 102 from the measured vessel. (FIG. 7 illustrates deflection toward the grating.) The diffraction pattern will thus change in a quantifiable way as micromachined diaphragm 422 is so-deflected toward or away from grating 424 because of these pressure variations.

In the preferred embodiment of the present invention, primary output fiber 110 is placed in a location to collect the interference between the central order of the diffraction pattern and the light reflected from the top surface of diaphragm 422. Similarly, secondary output fiber 112 is placed in a location to collect the interference between the first order of the diffraction pattern and the light reflected from the top surface of diaphragm 422. The primary and secondary output fibers 110 and 112 respectively, transmit the collected light interference to multiple channel photodetector 114, to sense the interference intensity at the two positions. By comparison of the relative interference intensities measured at the specific order positions, a diaphragm displacement value and subsequently an applied pressure measurement can be determined. There are established relationships known in the art to determine the pressure on various shaped diaphragms based on their measured center deflections, as a function of Young's modulus and Poisson's ratio, such as are described in H. Chau and K. D. Wise, IEEE Trans. Electr. Dev., v. ED-34, #4, 1987, p. 850–858.

The design parameters of diaphragm grating device 106, including the thickness of micromachined diaphragm 422, the distance between diaphragm 422 and diffraction grating 424, the width of grating rulings 728, and the spacing between grating rulings 728, all contribute to design parameters of the entire diffractive pressure sensor 100 and its overall performance. Specifically, the positioning of primary and secondary output fibers 110 and 112 respectively, are dependent upon the expected location of the central and first order of diffracted light produced by diffraction grating 424, which is wholly dependent upon the design parameters of diffraction grating 424 as mentioned above.

Figure 8A:
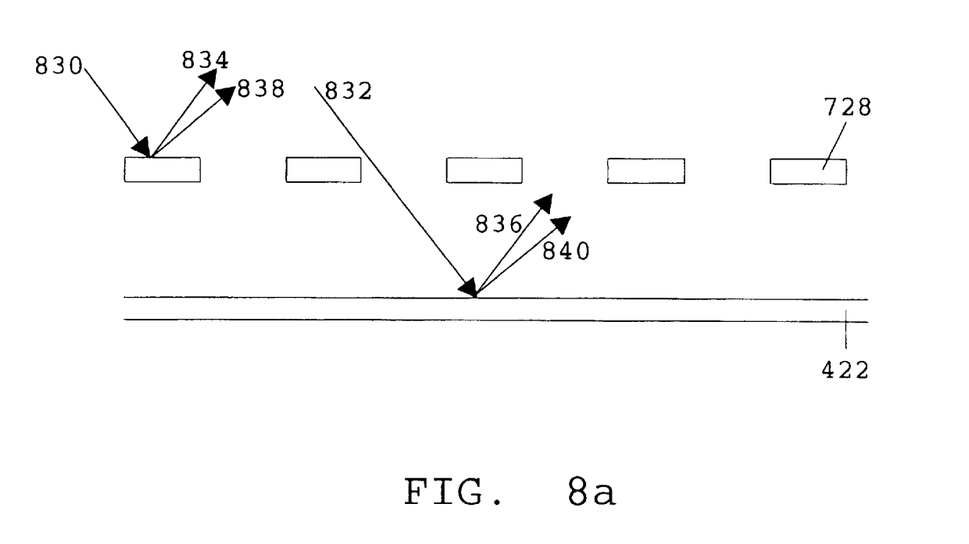
FIG. 8a is a close up cross-sectional view of the diaphragm grating device in an undeflected position, and the diffractive light pathways.
Figure 8B:
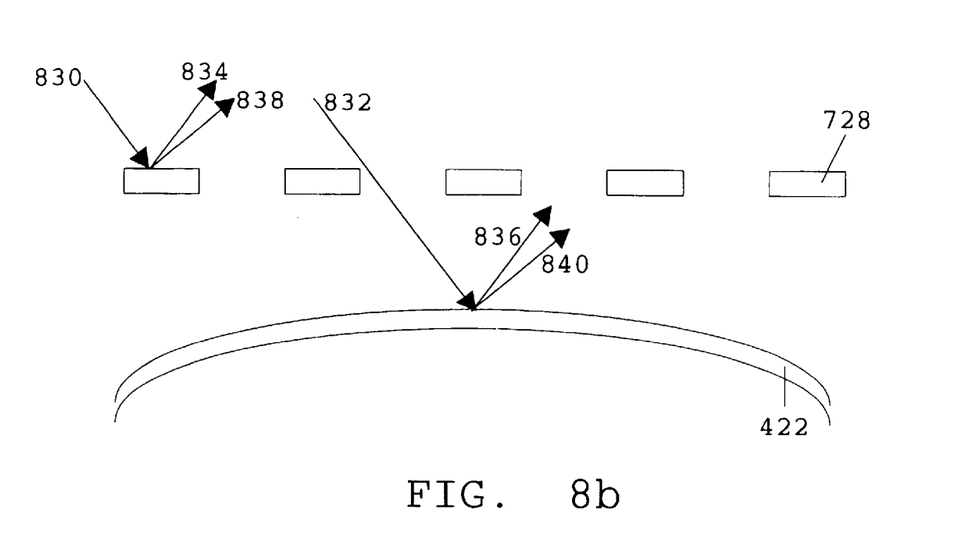
FIG. 8b is a close up cross-sectional view of the diaphragm grating device with a deflected diaphragm, and the diffractive light pathways.

FIGS. 8a and 8b specifically show the lightpaths produced by the components of the diaphragm grating device 106. Incoming light will strike and be reflected from either an individual grating ruling 728, or diaphragm 422. An illustrative light ray striking grating ruling 728 is denoted by 830, and an illustrative light ray striking diaphragm 422 is denoted by 832. The light 830 striking grating rulings 728 is reflected into ruling-reflected zero order light 834 and ruling-reflected first order light 838. Similarly, the light 832 striking diaphragm 422 is reflected into diaphragm-reflected zero order light 836 and diaphragm-reflected first order light 840. FIG. 8a shows the light paths for an undeflected diaphragm 422 and FIG. 8b shows the light paths for a deflected diaphragm 422. Although the paths appear similar, the interference intensity at zero order and first order positions changes with the deflection of diaphragm 422, and this is what is used as the basis for very precise pressure measurements.

More specifically, the displacement of diaphragm 422 defines the specific interference intensity of light that is collected at the central and first order positions by primary and secondary output fibers 110 and 112, respectively. At these locations, reflections of light from grating rulings 728 and reflections of light from diaphragm 422 will interfere with each other. By the nature of the design, the angle of incidence, and operating principles of diffraction gratings in general, when the distance between the reflecting surface of rulings 728 and the reflecting surface of diaphragm 422 is an even number of quarter-wavelengths of impinging light 830, 832 from diode laser 120, the interference intensity in the zero order is at a maximum. Similarly, when the distance between the reflecting surface of rulings 728 and the reflecting surface of diaphragm 422 is an odd number of quarter-wavelengths of impinging light from diode laser 120, the interference intensity in the zero order is at a minimum as the intensity is redistributed to higher orders. To minimize error induced by fluctuations of diode laser 120, in the practical implementation of this pressure sensor system, the relative intensities, $I_R$, of the interference at the primary and secondary fibers, 110 and 112 respectively, which collect the interference intensity at the central and first order positions, respectively, are both measured and compared. The most accurate comparison is made when the relationship $I_R=(I_0-I_1)/(I_0+I_1)$ is calculated. Where $I_0$ is the measured interference intensity at the central or zero order location, as collected by the primary output fiber, and $I_1$ is the measured interference intensity at the first order location, as collected by the secondary output fiber. Typically, the sum of $I_0$ and $I_1$ is a constant, regardless of the degree of deflection of the membrane.

Since the majority of the light will be reflected into the central and first order positions in any configuration used, the preferred embodiment described above is generally sufficient for most applications and is the most useful, cost-effective design for the present invention. However, it would be obvious to someone of ordinary skill, and is considered to be within the scope of this disclosure and its associated claims, to expanding the output measurement to include higher diffractive orders as well. To do so, alternative blazes of diffraction grating 424 are incorporated into the design of the sensor in order to include the measurement of the higher diffractive orders, wherein "blazing" a grating constitutes reshaping individual beam elements in order to maximize the intensity diffracted into a specific order.

An alternative embodiment of the present invention includes alternative configurations of diaphragm 422 of diaphragm grating device 106. To broaden the pressure range measurement capability of pressure sensor 100, diaphragm 422 is alternatively constructed with variations in thickness. This thickness variation can be embodied as an incremental increase in thickness across the entire diaphragm 422, or as individual localized elements embedded in the diaphragm 422. Such thickness variations in diaphragm 422 would increase the pressure measurement range since a thinner diaphragm 422 will deflect more than a thicker diaphragm 422 under the same pressure. This extension of the range would be accounted for in the calculation of pressure by a calibration factor specific to the area of diaphragm 422 used for the measurement.

Another alternative embodiment of the invention involves replacing the multiple output fibers (110 and 112) with a single multimode output fiber through which the interference intensity collected at each order position can be transmitted simultaneously. The plane of the grating is imaged onto the input end of the multimode fiber to allow the multiple order transmission. Multimode fiber transmits light along different modes or pathways within the fiber based on angle of input into the fiber. At the output end of the fiber, the various modes can be differentiated by the angle of output. This configuration minimizes the effect of temperature, stress and bending of the fiber on the results since only a single fiber is used.

Alternatively, the multimode fiber described above can be used as a single lightwave input and output means to replace all of the fibers, both input and output (namely, 116, 110, and 112). In this configuration, the multimode fiber would provide the illumination and collect the output simultaneously.

An additional alternative embodiment of the invention provides an alternative means of implementing the diaphragm grating device portion of the system utilizing an electronically reconfigurable diffraction grating. This alternative embodiment only requires the use of a single output fiber. This alternative configuration replaces the interference intensity measurements collected from the zero order and first order positions with successive interference intensity measurements of any single order position with the grating in an undeflected position and also in a deflected position.

This configuration simplifies the measurement process by allowing the interference intensity at any order to be collected by the single output fiber, but the sensitivity of the measurement remains the same since it is still an interference based measurement. In addition, the measurement remains differential, insensitive to fluctuations of the laser power and properties of the fiber used for transporting the light from the laser to the sensor. Referring to FIGS. 9a, 9b, 9c and 9d, the reconfigurable grating in this embodiment comprises the same series of rulings 728 as the preferred embodiment, but also a corresponding set of electrodes 944 directly under the rulings on the surface of the diaphragm 422. In this configuration, as in the preferred embodiment, impinging light 946 strikes grating rulings 728. Simultaneously, diaphragm-impinging light 948 strikes the surface of diaphragm 422. Ruling-diffracted light 950 in any single diffraction order interferes with diaphragm diffracted light 952 at the face of the output collection fiber. The interference of this collected light is transferred to the photodetector, as shown in FIG. 1 for the preferred embodiment.

Figure 9A:
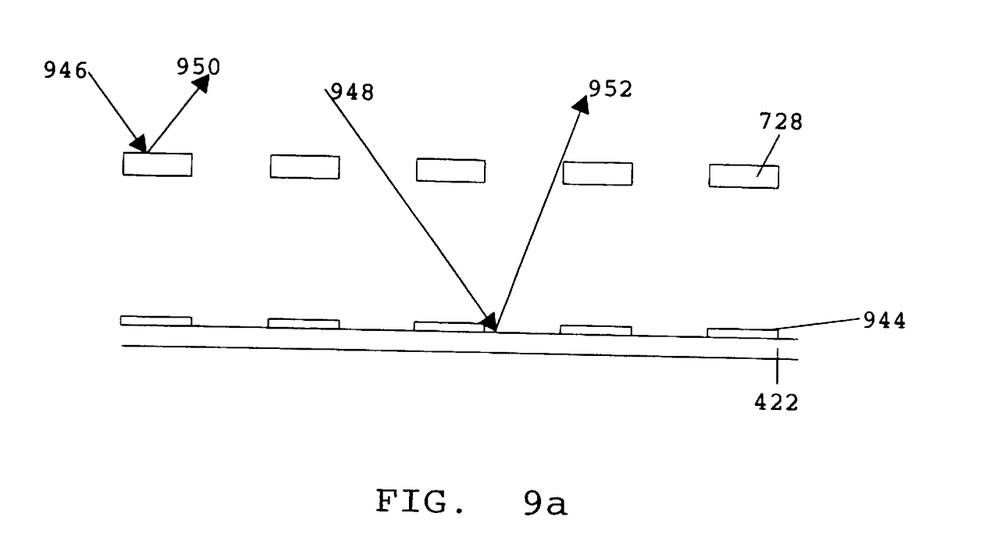
FIG. 9a is a close up cross-sectional view of an alternative embodiment of the diaphragm grating device, with undeflected rulings, an undeflected diaphragm and diffractive light pathways.
Figure 9B:
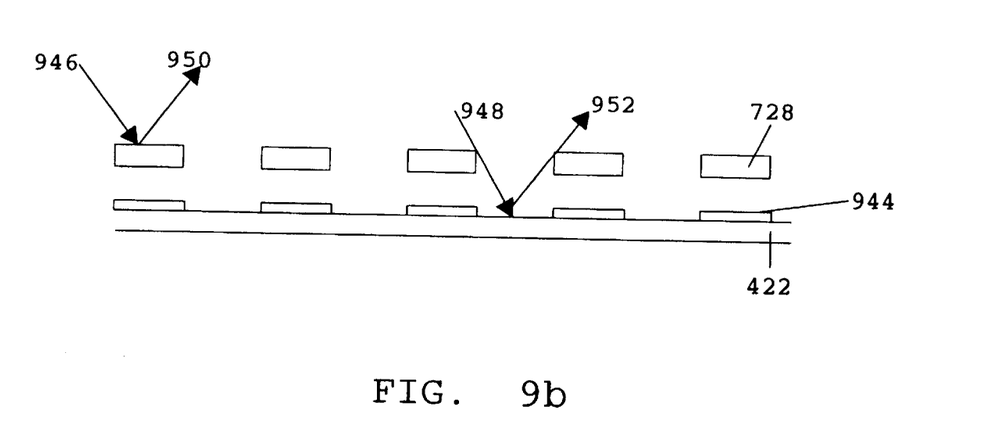
FIG. 9b is a close up cross-sectional view of an alternative embodiment of the diaphragm grating device, with deflected rulings, an undeflected diaphragm and diffractive light pathways.
Figure 9C:
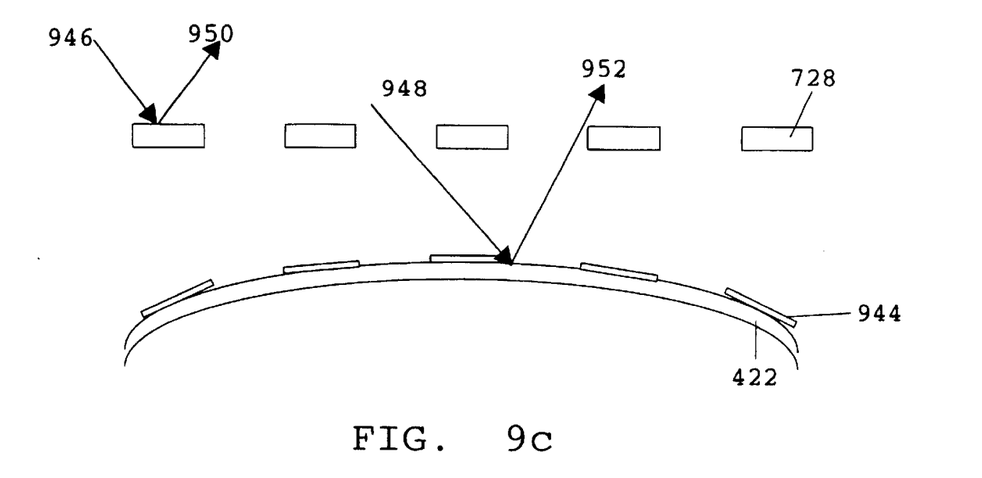
FIG. 9c is a close up cross-sectional view of an alternative embodiment of the diaphragm grating device, with undeflected rulings, a deflected diaphragm and diffractive light pathways.
Figure 9D:
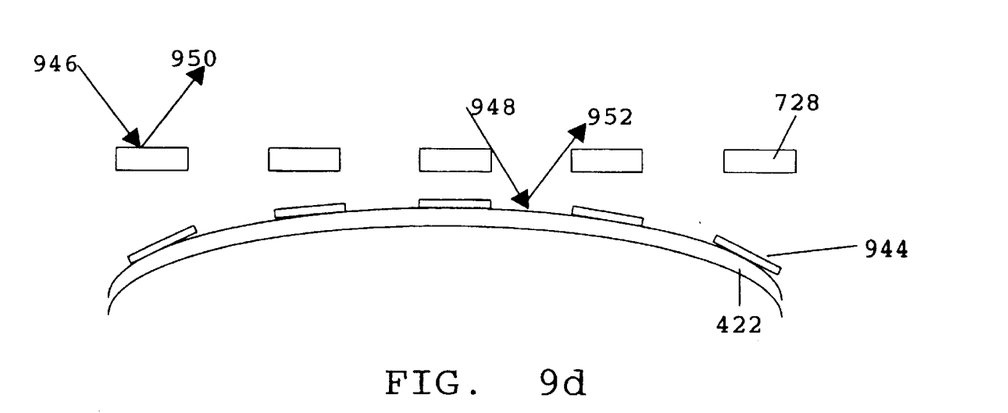
FIG. 9d is a close up cross-sectional view of an alternative embodiment of the diaphragm grating device, with deflected rulings, a deflected diaphragm and diffractive light pathways.

The relative interference intensity, $I_R$, collected at the selected order position is calculated according the identical equation as in the preferred embodiment, $I_R=(I_0-I_1)/(I_0+I_1)$. However, in this embodiment, $I_0$ is equal to the interference intensity collected by a single output fiber in the specified order position when the grating rulings 728 are in a initial, undeflected position (as represented in FIGS. 9a and 9c). Similarly, $I_1$ is equal to the interference intensity collected by the single output fiber in the specified order position when the grating rulings 728 are in a deflected position (represented in FIGS. 9b and 9d). This deflection, for each grating ruling, is caused by application of a predetermined DC voltage to its corresponding electrode 944. This relative intensity measurement, $I_R$, is taken when diaphragm 422 is in an initial, undeflected or unpressurized position (represented by FIGS. 9a and 9b), and compared to the relative intensity measurement, $I_R$, taken when the diaphragm 422 is at a secondary, deflected or pressurized position (represented by FIGS. 9c and 9d). This provided the basis for calculating the deflection of diaphragm 422, and hence fluidic pressure in pressure chamber 104.

This alternative embodiment can be implemented with several variations. For example, the electrodes 944 under the grating rulings 728 can be segmented, as shown in FIGS. 9a through 9d, or a continuous solid electrode that is under all rulings and the spacing between (not shown in Figures). Alternatively, the electrodes 944 can be under a periodic series of rulings 728 (for example, every other ruling, or every third ruling, etc.) to create a desired diffraction pattern for a specific application. The final alternative includes a variation in which a solid electrode is under all rulings and a sound frequency AC voltage is applied to the electrode. This would cause similar oscillations in the intensity and thus output to the photodetector 114 as the separate DC voltage application described above.

While only certain preferred features of the invention have been illustrated and described, many modifications, changes and substitutions will occur to those skilled in the art. It is, therefore, to be understood that this disclosure and its associated claims are intended to cover all such modifications and changes as fall within the true spirit of the invention.

We claim:

1. A pressure sensor for sensing at least one pressure to be measured, comprising:

a reflective diffraction grating comprising a plurality of grating rulings;

a flexible reflective diaphragm proximate and substantially parallel to said diffraction grating;

lightwave input means for impinging light on said diffraction grating and, through said diffraction grating, on said diaphragm, as impinging light;

lightwave output means for collecting said impinging light, once said light has been reflected off of said diaphragm through said grating, and off of said diffraction grating, as reflected light;

a pressure chamber enabling said at least one pressure to be measured to deflect said diaphragm from an undeflected position of said diaphragm; and pressure measurement means for collecting interference between a diffraction pattern of said light reflected off of said grating, and said light reflected off of said diaphragm, and, based on said collected interference, obtaining a diaphragm deflection measurement and a corresponding pressure measurement for each of said pressures to be measured.

2. The pressure sensor of claim 1, said lightwave output means further comprising:

means for collecting interference between at least two different orders of said diffraction pattern, and said light reflected off of said diaphragm; wherein said pressure measurement means obtains said pressure measurement for each of said pressures to be measured by comparing an interference intensity measured at one of said at least two order positions relative to an interference intensity measured at at least one other one of said at least two order positions.

3. The pressure sensor of claim 2, said lightwave output means further comprising:

primary lightwave output means for collecting interference intensity between a central order of said diffraction pattern and said light reflected off of said diaphragm, said central order comprising said one of said at least two orders; and secondary lightwave output means for collecting interference intensity between a first order of said diffraction pattern and said light reflected off of said diaphragm, said first order comprising said at least one other one of said at least two orders; wherein said pressure measurement means obtains said pressure measurement for each of said pressures to be measured by comparing an interference intensity measured at central order position by said primary lightwave output means relative to an interference intensity measured at first order position by said secondary lightwave output means.

4. The pressure sensor of claim 2, wherein the relative comparison $I_R$ of interference intensity measured at one of said at least two order positions by said primary lightwave output means, designated $I_0$, with interference intensity measured at at least one other one of said at least two order positions by said secondary lightwave output means, designated $I_1$, is determined according to the relationship $I_R=(I_0-I_1)/(I_0+I_1)$.

5. The pressure sensor of claim 1, said flexible reflective diaphragm further comprising:

at least one electrode located to substantially interact electrically with at least one of said grating rulings, the application of a voltage to said at least one electrode causing said at least one of said grating rulings corresponding with said at least one electrode to move from an undeflected position into a deflected position; wherein:

said pressure measurement means obtains said pressure measurement for each of said pressures to be measured by comparing an interference intensity measured when said grating rulings are in said undeflected position relative to an interference intensity measured when said grating rulings are in said deflected position.

6. The pressure sensor of claim 5, wherein the relative comparison $I_R$ of interference intensity measured when said grating rulings are in said undeflected position, designated $I_0$, with interference intensity measured when said grating rulings are in said deflected position, designated $I_1$, is determined according to the relationship $I_R=(I_0-I_1)/(I_0+I_1)$.

7. The pressure sensor of claim 1, said diaphragm comprising a micromachined device.

8. The pressure sensor of claim 1, further comprising a laser light source originating said impinging light.

9. The pressure sensor of claim 1, further comprising a gradient index medium transmitting said impinging light and said reflected light between said lightwave input and output means, and said grating and diaphragm.

10. The pressure sensor of claim 1, further comprising a discrete lens system transmitting said impinging light and said reflected light between said lightwave input and output means, and said grating and diaphragm.

11. The pressure sensor of claim 1, said lightwave input means comprising a single mode fiber impinging said light.

12. The pressure sensor of claim 2, said lightwave output means comprising at least two single mode fibers, one said single mode fiber corresponding to and collecting each of said at least two different orders being collected.

13. The pressure sensor of claim 2, said lightwave output means comprising a single multimode fiber for simultaneously collecting at least two of said at least two different orders being collected.

14. The pressure sensor of claim 5, said lightwave output means comprising a single multimode fiber for collecting said interference intensity measured when said grating rulings are in said undeflected position, and said interference intensity measured when said grating rulings are in said deflected position.

15. The pressure sensor of claim 2, said lightwave input means and said lightwave output means comprising a single multimode fiber simultaneously impinging said light, and collecting at least two of said at least two different orders being collected.

16. The pressure sensor of claim 5, said lightwave input means and said lightwave output means comprising a single multimode fiber simultaneously impinging said light, and collecting said interference intensity measured when said grating rulings are in said undeflected position, and collecting said interference intensity measured when said grating rulings are in said deflected position.

17. The pressure sensor of claim 5, said at least one electrode comprising a plurality of electrodes, each of said plurality of electrodes corresponding with and substantially interacting electrically, periodically, with every Nth one of said grating rulings, where N is an integer greater than 0.

18. The pressure sensor of claim 17, where N is an integer greater than 1.

19. The pressure sensor of claim 5, said at least one electrode comprising a continuous single electrode substantially interacting electrically with all of said grating rulings.

20. A method for sensing at least one pressure to be measured, comprising the steps of:

impinging light on a reflective diffraction grating comprising a plurality of grating rulings and, through said diffraction grating, on a flexible reflective diaphragm proximate and substantially parallel to said diffraction grating, as impinging light, using lightwave input means;

collecting said impinging light, once said light has been reflected off of said diaphragm through said grating, and off of said diffraction grating, as reflected light, using lightwave output means;

introducing said at least one pressure to be measured into a pressure chamber, thereby deflecting said diaphragm from an undeflected position of said diaphragm;

collecting interference between a diffraction pattern of said light reflected off of said grating, and said light reflected off of said diaphragm; and based on said collected interference, obtaining a diaphragm deflection measurement and a corresponding pressure measurement for each of said pressures to be measured, using pressure measurement means.

21. The method of claim 20, said step of collecting said impinging light comprising the further step of collecting interference between at least two different orders of said diffraction pattern, and said light reflected off of said diaphragm; and said step of obtaining said pressure measurement for each of said pressures to be measured comprising the further step of comparing an interference intensity measured at one of said at least two orders relative to an interference intensity measured at at least one other one of said at least two orders.

22. The method of claim 21, said step of collecting said impinging light comprising the further steps of:

collecting interference between a central order of said diffraction pattern and said light reflected off of said diaphragm, said central order comprising said one of said at least two orders, using primary lightwave output means; and collecting interference between a first order of said diffraction pattern and said light reflected off of said diaphragm, said first order comprising said at least one other one of said at least two orders, using secondary lightwave output means; and said step of obtaining a pressure measurement for each of said pressures to be measured comprising the further step of comparing an interference intensity measured at said central order relative to an interference intensity measured at said first order.

23. The method of claim 21, wherein comparing an interference intensity measured at one of said at least two orders, designated $I_0$, with interference intensity measured at at least one other one of said at least two orders, designated $I_1$, comprises the further step of determining a relative interference intensity $I_R$ according to the relationship $I_R=(I_0-I_1)/(I_0+I_1)$.

24. The method of claim 20, comprising the further steps of:

applying a voltage to at least one electrode of said diaphragm located to substantially interact electrically with at least one of said grating rulings, causing said at least one of said grating rulings corresponding with said at least one electrode to move from an undeflected position into a deflected position; and said step of obtaining a pressure measurement for each of said pressures to be measured comprising the further step of comparing an interference intensity measured when said grating rulings are in said undeflected position relative to an interference intensity measured when said grating rulings are in said deflected position.

25. The method of claim 24, wherein comparing a light power interference intensity measured when said grating rulings are in said undeflected position, designated $I_0$, with interference intensity measured when said grating rulings are in said deflected position, designated $I_1$, comprises the further step of determining a relative interference intensity $I_R$ according to the relationship $I_R=(I_0-I_1)/(I_0+I_1)$.

26. The method of claim 20, said diaphragm comprising a micromachined device.

27. The method of claim 20, further comprising the step of originating said impinging light using a laser light source.

28. The method of claim 20, comprising the further step of transmitting said impinging light and said reflected light between said lightwave input and output means, and said grating and diaphragm, using a gradient index medium.

29. The method of claim 20, comprising the further step of transmitting said impinging light and said reflected light between said lightwave input and output means, and said grating and diaphragm, using a discrete lens system.

30. The method of claim 20, comprising the further step of impinging said light using a single mode fiber comprising said lightwave input means.

31. The method of claim 21, comprising the further step of collecting said impinging light using at least two single mode fibers, one said single mode fiber corresponding to and collecting each of said at least two different orders being collected, comprising said lightwave output means.

32. The method of claim 21, comprising the further step of collecting said impinging light using a single multimode fiber for simultaneously collecting at least two of said at least two different orders being collected, comprising said lightwave output means.

33. The method of claim 24, comprising the further step of collecting said impinging light using a single multimode fiber for collecting said light power interference intensity measured when said grating rulings are in said undeflected position, and said interference intensity measured when said grating rulings are in said deflected position, comprising said lightwave output means.

34. The method of claim 21, comprising the further step of simultaneously impinging said light, and collecting at least two of said at least two different orders being collected, using a single multimode fiber, comprising said lightwave input means and said lightwave output means.

35. The method of claim 24, comprising the further step of simultaneously impinging said light, and collecting said interference intensity measured when said grating rulings are in said undeflected position, and collecting said interference intensity measured when said grating rulings are in said deflected position, using a single multimode fiber comprising said lightwave input means and said lightwave output means.

36. The method of claim 24, said at least one electrode comprising a plurality of electrodes, each of said plurality of electrodes corresponding with and substantially interacting electrically, periodically, with every Nth one of said grating rulings, where N is an integer greater than 0.

37. The method of claim 36, where N is an integer greater than 1.

38. The method of claim 24, said at least one electrode comprising a continuous single electrode substantially interacting electrically with all of said grating rulings.

* * * * *